(12) United States Patent
Seale

(10) Patent No.: US 11,486,466 B2
(45) Date of Patent: Nov. 1, 2022

(54) SHACKLE WITH PUSH TO ENGAGE CONNECTOR

(71) Applicant: Ulven Machinery Company, Inc., Hubbard, OR (US)

(72) Inventor: Christopher R. Seale, McMinnville, OR (US)

(73) Assignee: Ulven Machinery Company, Inc., Hubbard, OR (US)

( * ) Notice: Subject to any disclaimer, the term of this patent is extended or adjusted under 35 U.S.C. 154(b) by 962 days.

(21) Appl. No.: 16/248,554

(22) Filed: Jan. 15, 2019

(65) Prior Publication Data

US 2020/0224747 A1     Jul. 16, 2020

(51) Int. Cl.
*F16G 15/06* (2006.01)

(52) U.S. Cl.
CPC .................................. *F16G 15/06* (2013.01)

(58) Field of Classification Search
CPC .......................... F16G 15/06; Y10T 403/32893
See application file for complete search history.

(56) References Cited

U.S. PATENT DOCUMENTS

| 4,378,187 A | 3/1983 | Fullerton |
| 5,324,150 A | 6/1994 | Fullerton |
| 5,378,100 A | 1/1995 | Fullerton |
| 5,427,488 A | 6/1995 | Fullerton et al. |
| 5,580,200 A | 12/1996 | Fullerton |
| 7,540,140 B1* | 6/2009 | Diaz ........................ F16G 15/06 70/52 |
| 2005/0276658 A1* | 12/2005 | Silva ........................ F16G 15/06 403/154 |
| 2011/0265442 A1* | 11/2011 | Segura ....................... B66C 1/66 59/86 |
| 2012/0201599 A1* | 8/2012 | Reppen ................... F16G 15/06 403/348 |
| 2017/0114861 A1* | 4/2017 | Ohman, III ............. F16B 45/04 |
| 2018/0274631 A1* | 9/2018 | Betzler ................... F16G 15/06 |

* cited by examiner

*Primary Examiner* — Robert Sandy
*Assistant Examiner* — Rowland Do
(74) *Attorney, Agent, or Firm* — Klarquist Sparkman, LLP

(57) ABSTRACT

A shackle includes a body having a first ear, a second ear opposed to the first ear and separated from the first ear to define a gap, a U-shaped bow extending from the first ear to the second ear and a pin. There is a first opening defined in the first ear and a threaded connection at the second ear. The pin has a proximal end, an intermediate section and an axial threaded section positioned distally of the proximal end. The axial threaded section and the intermediate section are dimensioned to be inserted through the first opening in the first ear and into the second ear with the intermediate section extending across the gap. The threaded section on the pin is engageable with the threaded connection at the second ear by urging the pin axially in translation relative to threaded connection.

16 Claims, 3 Drawing Sheets

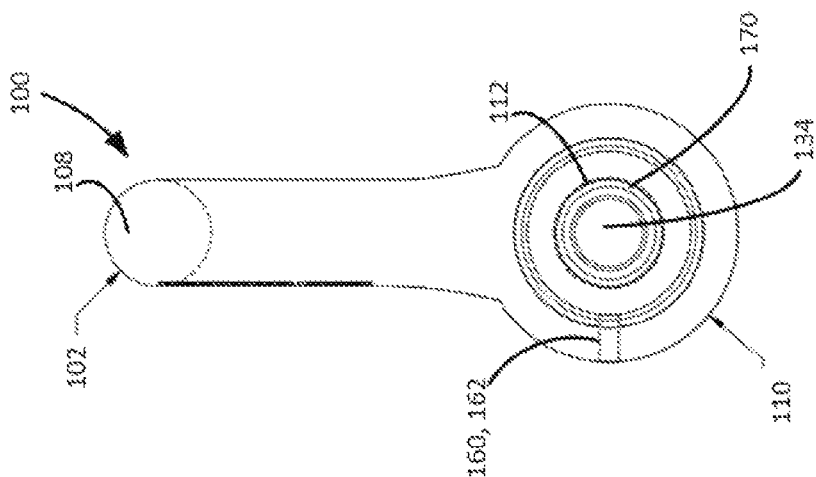
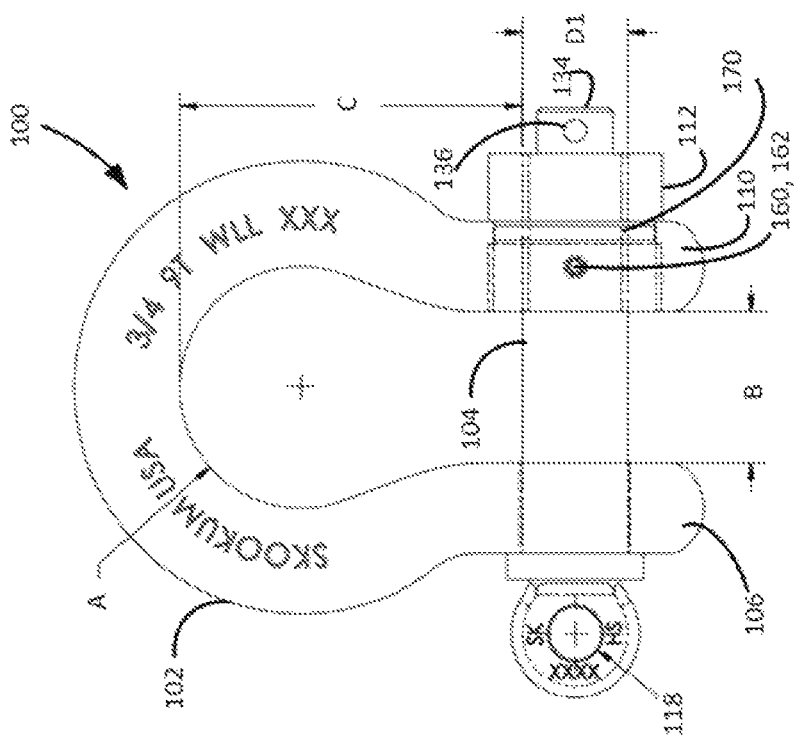

SHACKLE WITH PUSH TO ENGAGE CONNECTOR

BACKGROUND

Shackles are rigging components used in lifting and moving operations to connect to various other rigging components quickly and securely. Shackles typically have a generally U-shaped shackle body and a removable pin that can be unthreaded or otherwise disassembled from the shackle body to permit another component to be connected to the shackle.

Threading or unthreading a shackle pin is usually accomplished manually by an operator. When a rigging operation is carried out in a dangerous environment, such as at sea during rescue operations, however, it can be difficult for an operator to complete shackle assembly operations predictably and quickly without increasing risks to personal safety. Mishandling a component and inadvertently dropping it can have dire consequences.

Past efforts at providing a push to engage connection on a shackle were focused on welding a push to engage nut designed for other applications to a conventional shackle. Because the shackle was not designed for use with the nut, the resulting shackle and pin combination were not precisely configured to handle loading conditions as well as a conventional shackle. Also, the nut was permanently attached to the shackle and could not be exchanged for a different nut without rewelding, which is time-consuming process and very difficult in the field. It was also difficult to provide any additional safeguards against the pin becoming loosened and/or lost.

SUMMARY

Described below are embodiments of a shackle that address some of the shortcomings of conventional technology.

According to one implementation, a shackle comprises a body having a first ear, a second ear opposed to the first ear and separated from the first ear to define a gap, and a U-shaped bow extending from the first ear to the second ear, and a pin. A first opening is defined in the first ear, and there is a threaded connection at the second ear. The pin has a proximal end, an intermediate section and an axial threaded section positioned distally of the proximal end. The axial threaded section and the intermediate section are dimensioned to be inserted through the first opening in the first ear and into the second ear with the intermediate section extending across the gap. The threaded section on the pin is engageable with the threaded connection at the second ear by urging the pin axially in translation relative to threaded connection.

In some implementations, the threaded connection is removably coupled to the second ear.

In some implementations, the threaded connection at the second ear comprises a threaded connector threadedly coupled to an internal thread formed in an opening on the second ear. The threaded connector can comprise an internal engaging portion configured to receive and retain the threaded section of the pin.

The threaded connection can protrude outwardly beyond an outer side of the second ear.

The threaded section on the pin can have a second diameter, and the intermediate section adjacent the threaded section can be unthreaded and have a first diameter larger than the second diameter. At least a portion of the threaded connection at the second ear can be configured to have an opening sized to receive the intermediate section with the first diameter that extends into a bore, and the bore can be dimensioned to receive a predetermined length of the intermediate section.

The second ear can comprise a retaining screw bore and retaining screw. The retaining screw can be rotatable within the retaining screw bore to contact the threaded connection to restrain the threaded connection from rotating relative to the second ear.

The threaded connection can have a dimple at a predetermined location that is dimensioned to receive an end of the retaining screw.

The threaded connection can be configured to allow the pin to be disengaged by rotating the pin in a counterclockwise direction relative to the threaded connection to unthread the pin.

The pin can comprise a distal end configured to protrude beyond the second ear and threaded connection when the pin is fully inserted in the bow, and the distal end can comprise a transverse bore for receiving a retaining member.

The first ear can have an opening sized to receive a portion of the intermediate section of the pin having the first diameter.

The threaded connection can have a cylindrical outer end.

According to another implementation, a shackle comprises a body having a first ear, a second ear opposed to the first ear and separated from the first ear to define a gap, and a bow extending from the first ear to the second ear. A threaded connection at the second ear is provided on a removable connector. A pin having a proximal end, an intermediate section and an axial threaded section positioned distally of the proximal end is provided. The axial threaded section and the intermediate section are dimensioned to be inserted through an opening in the first ear and into the second ear with the pin extending across the gap. The threaded section on the pin is engageable with the threaded connection at the second ear by urging the pin axially in translation relative to threaded connection.

The removable connector can be threadedly coupled to the second ear. The removable connector can comprise a threaded section with an external thread, and the threaded section with the external thread can have an axial dimension less than an axial dimension of the second ear.

The removable connector can comprise a threaded section with an external thread, further comprising an adjacent thread relief.

The removable connector can protrude outwardly beyond an outer side of the second ear.

The removable connector can comprise an internal engaging portion configured to receive and retain the threaded section of the pin.

The threaded section on the pin can have a second diameter, and wherein the intermediate section adjacent the threaded section is unthreaded and has a first diameter larger than the second diameter. At least a portion of the threaded connection at the second ear can be configured to have an opening sized to receive the intermediate section with the first diameter that extends into a bore, and wherein the bore is dimensioned to receive a predetermined length of the intermediate section.

The removable connector can be dimensioned to extend through an entire dimension of the second ear.

The foregoing and other objects, features, and advantages will become more apparent from the following detailed description, which proceeds with reference to the accompanying figures.

BRIEF DESCRIPTION OF THE DRAWINGS

FIGS. 2 and 3 are front elevation and side elevation views, respectively, of the shackle of FIG. 1.

DETAILED DESCRIPTION

Figure 1:
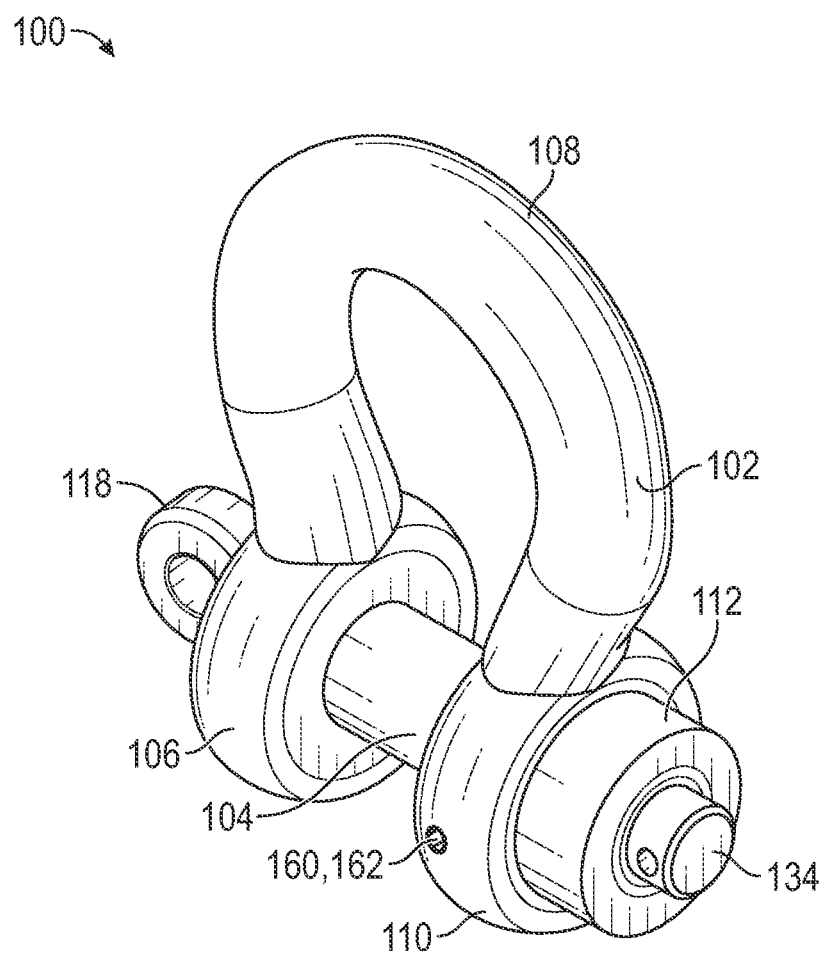
FIG. 1 is a perspective view of a shackle according to one implementation.

Described below are implementations of a shackle (also sometimes referred to as a "shackle assembly") having a push to engage threaded connector.

Referring to FIGS. 1-4, a representative shackle 100 of the "bow" shackle type is shown. The shackle 100 has a body 102 and a pin 104 that is removably coupled to the body 102. The body 102 has a first ear 106 at one end, a bow 108 that extends from the first ear 106 and forms a loop, and a second ear 110 at an opposite end opposed to the first ear 106. An opening or gap B is defined between the first ear 106 and the second ear 110. The pin 104 is dimensioned to be inserted through the first ear 106, extended across the gap B, and coupled at the second ear 110, as is described below in greater detail. The bow 108 can be further described as having an opening with a radius A and a depth or reach C as shown.

The pin 104 is coupled at the second ear 110 by a threaded connection that is axially engageable. That is, the pin 104 can be inserted axially (i.e., using translation without rotation) into the threaded connection in a first direction, which in turn engages the pin 104. The pin 104 is prevented from withdrawal in a second direction opposite the first direction, except by rotation (such as in a counterclockwise direction, similar to a conventional threaded connection). Thus, the connection can be referred to as a "push to engage" or "push to tighten" connection. In some implementations, in addition to the "push to engage" capability, the push to tighten connection also allows establishing the threaded connection by threading the pin 104 into the ear 110 conventionally, i.e., by rotating the pin 104 relative to the ear 110 so that respective threads engage each other and cause the pin 104 to advance axially as it is rotated.

In the implementation of FIGS. 1-3, there is an axially engageable connector 112 coupled to the second ear 110 of the shackle 100. The axially engageable connector 112 is a representative form of the axially engageable connection described above. The axially engageable connector 112 is coupled to the second ear 110, preferably in removable way. In the illustrated implementation, the axially engageable connector 112 is removable via a threaded connection with the second ear 110 from an outer side thereof by engagement between an internal thread 140 in the second ear 110 and an external thread 142 on the axially engageable connector 112, or an alternate form of removable assembly. In implementations having the external thread 142, an optional thread relief 158 (FIG. 4) can be provided adjacent the external thread 142. The thread relief 158 has a diameter smaller than the diameter of the external thread 142.

Figure 4:
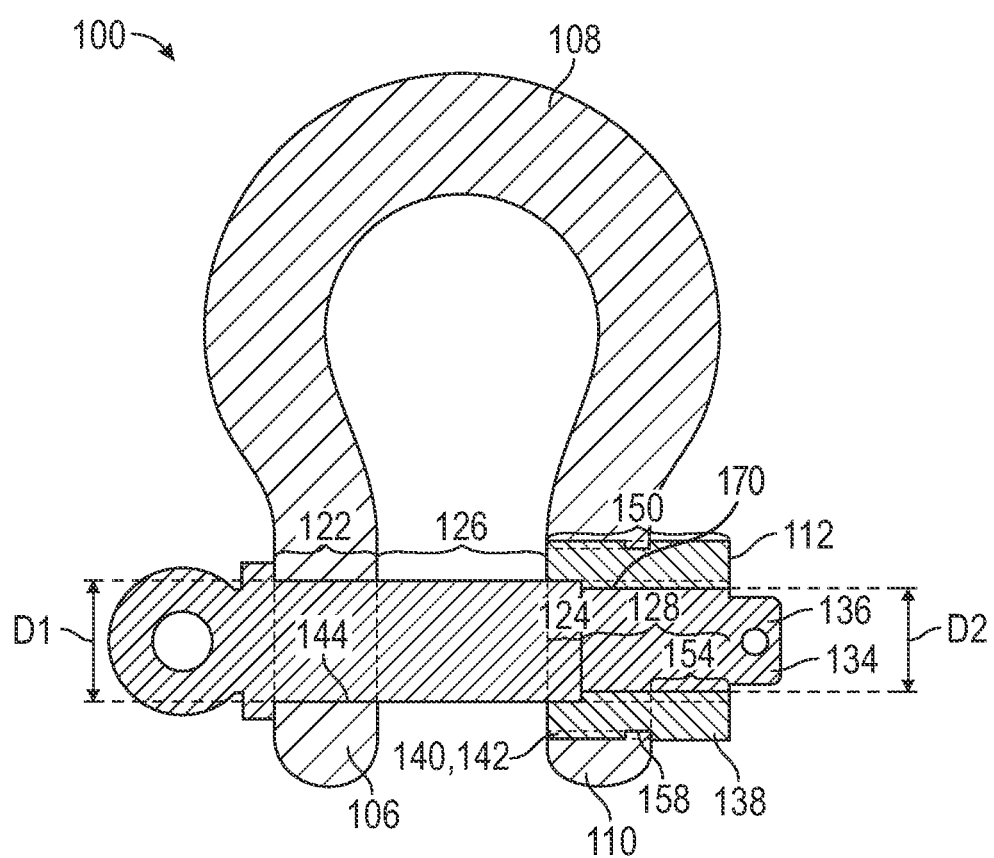
FIG. 4 is a sectioned front elevation view of the shackle of FIG. 1.

FIG. 4 is a section view in elevation of the assembled shackle 100, showing the engagement between the body 102, the pin 104 and the axially engageable connector 112. The pin 104 has a proximal end 118, an intermediate section (with portions 122, 126 and 124) that is preferably unthreaded and has a first diameter D1, and an adjacent section 128 that is threaded and has a second diameter D2. The second diameter D2 is smaller than the first diameter D1. The portion 122 of the intermediate section is received in an opening 144 in the first ear 106 when the pin 104 is fully installed in the shackle 100. The portion 122 is sized with a minimal clearance so that load is transferred appropriately from the pin 104 to the bow 108 when the shackle 100 is loaded during use. The portion 126 extending between the first ear 106 and the second ear 110 is the portion of the pin 104 that connects the shackle 100 to another object. The portion 124 is received in a bore of the axially engageable connector 112, which is unthreaded. The portion 124 provides a load bearing coupling between the pin 104 and the axially engageable connector 112, and in turn, between the axially engageable connector 112 and the second ear 110. The portion 124 has a depth less than the full depth of the second ear 110, but is sufficient to ensure that proper transfer of load occurs during use of the shackle 100.

By way of contrast, the section 128 has the second diameter D2, which is smaller than the first diameter D1. The section 128 is threaded, and is received within an internally threaded section of the axially engageable connector 112. Within the second ear 110, the portion 124 of the pin 104 has the first diameter, and the remaining part of the pin 104 has the second diameter.

The axially engageable connector 112 extends through the thickness of the second ear 110, rather than being attached solely to its outer side surface, which results in a more secure arrangement under loading conditions. In addition, the axially engageable connector 112 has a total length indicated at 150 and a protruding portion 138 with an exposed length indicated at 154. The pin 104 has a length dimensioned to extend beyond the protruding portion 138 as shown, and terminates at a distal end 134. As a result of being dimensioned to extend through the second ear 110 and the protruding portion 138, the pin 104 is longer than a conventional shackle pin for a shackle of a similar opening size. The distal end 134 can be provided with a transverse retainer pin bore 136 for receiving a retaining pin (not shown) as an additional safeguard to maintain the pin 104 coupled to the body 102. The proximal end 118 of the pin 104 may be configured as a screw end as illustrated, or it may be configured as a different type of end such as a bolt end.

In the illustrated implementation, the axially engageable connector 112 has a protruding portion 138 or end that is generally cylindrical. The protruding portion 138 could be provided in shapes other than cylindrical, such as shapes that include one or more flat surfaces, depending upon requirements of particular applications.

The axially engageable connector 112 can be installed with thread locking compound to assist in maintaining a secure connection between it and the second ear 110 during use of the shackle 100. In addition, the second ear 110 can have an optional set screw 160 in a set screw bore 162 positioned as shown to allow the set screw 160 to be rotated into contact with the outer surface of the axially engageable connector 112 to further assist in keeping it from becoming loosened, which could increase the risk of losing it, the pin 104 and/or the body 102, e.g., during efforts to assemble or dissemble the shackle in challenging conditions. If desired, the outer surface of the axially engageable connector 112 can be provided with a dimple at a predetermined location to receive the end of the set screw 160.

In some implementations, the internal configuration of the axially engageable connector 112, i.e., the arrangement that receives a conventional threaded end inserted axially (without threading) but allows removal only by unthreading, includes an internal engaging portion 170 (FIG. 4) and is similar to FASTORQ Zip Technology described at www- .fastorq.com/products/zipnut-technology and in U.S. Pat. Nos. 5,580,200, 5,378,100, 5,427,488 and 5,324,150. Other similar technologies that achieve a push to engage/unthread to release connection can also be used.

The body, pin and threaded connector can be formed of any suitable materials, e.g., various metals and other materials, depending upon the demands of the specific application for the shackle. For example, in some implementations, the body, pin and threaded connector are formed of a stainless steel, such as 17-4 stainless steel, which helps provide corrosion resistance in environments that include exposure to saltwater, such as use of the shackle in equipment rescue operations.

Although the axially engageable or push to tighten shackle is described in connection with bow-type shackles, the same approach can be used with other types of shackles, including D-shackles, chain shackles, etc.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A shackle, comprising:
   a body having a first ear, a second ear opposed to the first ear and separated from the first ear to define a gap, and a U-shaped bow extending from the first ear to the second ear;
   a first opening defined in the first ear;
   a second opening defined in the second ear, wherein an internal thread is defined within the second opening;
   a connector having an external thread shaped to engage the internal thread of the second opening and a through bore with an axially engageable internal thread;
   a pin having a proximal end, an intermediate section and an axial threaded section positioned distally of the proximal end, wherein the axial threaded section and the intermediate section are dimensioned to be inserted through the first opening in the first ear, across the gap and into the through bore of the connector, and
   wherein the axial threaded section on the pin is engageable with the axially engageable internal thread of the connector by urging the pin axially in translation relative to the connector.

2. The shackle of claim 1, wherein the connector protrudes outwardly beyond an outer side of the second ear.

3. The shackle of claim 1, wherein the axial threaded section on the pin has a second diameter, and wherein the intermediate section adjacent the axial threaded section is unthreaded and has a first diameter larger than the second diameter, and wherein an end portion of the bore of the connector is configured to have a diameter sized to receive the intermediate section with a minimal clearance over the end portion of the bore so that a load bearing coupling between the pin, the connector and the second ear is formed.

4. The shackle of claim 1, wherein the second ear comprises a retaining screw bore and a retaining screw, wherein the retaining screw is rotatable within the retaining screw bore to contact the connector to restrain the connector from rotating relative to the second ear.

5. The shackle of claim 4, wherein the connector has a dimple at a predetermined location that is dimensioned to receive an end of the retaining screw.

6. The shackle of claim 1, wherein the axially engageable internal thread of the connector is configured to allow the pin to be disengaged by rotating the pin in a counterclockwise direction relative to the connector to unthread the pin.

7. The shackle of claim 1, wherein the pin comprises a distal end configured to protrude beyond the second ear and the connector when the pin is fully inserted in the bow, and wherein the distal end of the pin comprises a transverse bore for receiving a retaining member.

8. The shackle of claim 1, wherein the end portion of the bore with the diameter sized to receive the intermediate section of the pin has a length shorter than a thickness of the second ear 1.

9. The shackle of claim 1, wherein the connector has a cylindrical outer end.

10. A shackle, comprising:
    a body having a first ear, a second ear opposed to the first ear and separated from the first ear to define a gap, and a bow extending from the first ear to the second ear;
    a connector removably received in the second ear and projecting outwardly from the second ear, the connector having a through bore with an axially engageable internal thread;
    a pin having a proximal end, an intermediate section and an axial threaded section positioned distally of the proximal end, wherein the axial threaded section and the intermediate section are dimensioned to be inserted through an opening in the first ear and into the through bore of the connector with the pin extending across the gap, and
    wherein the axial threaded section on the pin is engageable with the axially enogeable internal thread of the through bore by urging the pin axially in translation relative to the connector.

11. The shackle of claim 10, wherein the connector is threadedly coupled to the second ear.

12. The shackle of claim 10, wherein the connector comprises a threaded section with an external thread, wherein the threaded section with the external thread has an axial dimension less than an axial dimension of the second ear.

13. The shackle of claim 10, wherein the connector comprises a threaded section with an external thread, further comprising an adjacent thread relief.

14. The shackle of claim 10, wherein the removable: connector protrudes outwardly beyond an outer side of the second ear.

15. The shackle of claim 10, wherein the axial threaded section on the pin has a second diameter, and wherein the intermediate section adjacent the threaded section is unthreaded and has a first diameter larger than the second diameter, and wherein an end, portion of the through bore of the connector is configured to have a diameter sized to receive the intermediate section with minimal clearance over the end portion of the bore so that a load bearing coupling between the pin, the connector and the second ear is formed.

16. The shackle of claim 10, wherein the connector extends entirely through the second ear.

* * * * *

UNITED STATES PATENT AND TRADEMARK OFFICE
CERTIFICATE OF CORRECTION

PATENT NO. : 11,486,466 B2
APPLICATION NO. : 16/248554
DATED : November 1, 2022
INVENTOR(S) : Christopher R. Seale It is certified that error appears in the above-identified patent and that said Letters Patent is hereby corrected as shown below:

In the Claims

Column 6, Line 36, "axially enogeable" should read --axially engageable--.

Column 6, Line 56, "end, portion" should read --end portion--.

Signed and Sealed this
Twenty-seventh Day of December, 2022

Katherine Kelly Vidal
*Director of the United States Patent and Trademark Office*